(12) United States Patent
Sato (10) Patent No.: US 6,181,444 B1
(45) Date of Patent: Jan. 30, 2001

(54) IMAGE READING APPARATUS AND INFORMATION STORING MEDIUM USED THEREFOR

(75) Inventor: Tatsuya Sato, Ichinomiya (JP)

(73) Assignee: Brother Kogyo Kabushiki Kaisha, Nagoya (JP)

(*) Notice: Under 35 U.S.C. 154(b), the term of this patent shall be extended for 0 days.

(21) Appl. No.: 08/869,087

(22) Filed: Jun. 4, 1997

(30) Foreign Application Priority Data

Jun. 13, 1996 (JP) .................................... 8-152376

(51) Int. Cl.$^7$ ........................................ G03F 3/08
(52) U.S. Cl. ............................. 358/519; 358/521
(58) Field of Search ............................ 358/518, 519, 358/521, 456, 458; 382/167, 237

(56) References Cited

U.S. PATENT DOCUMENTS

| | | | |
|---|---|---|---|
| 4,535,351 | * 8/1985 | Van Roessel ................. | 348/176 |
| 4,608,595 | * 8/1986 | Nakayama et al. ............ | 348/655 |
| 4,709,274 | * 11/1987 | Tanioka ........................ | 358/455 |
| 4,763,199 | * 8/1988 | Suzuki .......................... | 358/445 |
| 5,177,602 | * 1/1993 | Fujimori ....................... | 358/522 |
| 5,513,007 | * 4/1996 | Ito et al. ....................... | 358/296 |
| 5,589,954 | * 12/1996 | Watanabe ..................... | 358/518 |
| 5,796,876 | * 8/1998 | Wang et al. ................... | 382/270 |
| 5,809,366 | * 9/1998 | Yamakawa et al. .......... | 358/519 |

* cited by examiner

Primary Examiner—Bhavesh Mehta
(74) Attorney, Agent, or Firm—Oliff & Berridge, PLC (57) ABSTRACT

An image reading apparatus includes an image sensor for reading images for output of corresponding analog image signals, an A/D converter for converting the analog image signals into multi-bit digital image data, and a γ-correction circuit for performing γ-correction of the digital image data. The image reading apparatus further includes a background gray level detection circuit for detecting a background gray level of the analog image signals on the basis of the digital image data, and a coefficient modifying circuit for modifying a standard set of γ-correction coefficient data into a modified set of γ-correction coefficient data on the basis of the detected background gray level.

18 Claims, 5 Drawing Sheets

IMAGE READING APPARATUS AND INFORMATION STORING MEDIUM USED THEREFOR

BACKGROUND OF THE INVENTION

1. Field of the Invention

The present invention relates to an image reading apparatus which is capable of performing γ-correction and background gray level correction in a facsimile machine or a photocopying machine for example. The present invention also relates to an information storing medium which is used for controlling such an image reading apparatus.

2. Description of the Related Art

Typically, an image reading apparatus, such as an image scanner of a facsimile machine, comprises an image reader for reading images of an image carrying paper for output of corresponding analog image signals, an A/D converter for converting the analog image signals into multi-bit digital image data, a γ-correction unit for performing γ-correction of the digital image data. Further, the image reading apparatus also includes means for correcting the background gray level of the image signals at the time of converting the analog image signals into the digital image data. Such background gray level correction is necessary because the dynamic range of the non-background image signals relative to the background image signals reduces to result in poor resolution if the background is relatively dark.

For background gray level correction, a conventional image reading apparatus incorporates a peak hold circuit for holding the peak level of analog image signals from an image reader, and the peak level held by the peak hold circuit is utilized as a high level reference value for an A/D converter. Thus, when the voltage of the analog image signals becomes equal to the peak value, the digital output of the A/D converter becomes equal to the high level reference value which is the highest value of the converter.

Another image reading apparatus is also known which incorporates an automatic gain control circuit including an amplifier for amplifying analog image signals to such a degree that the peak level of the analog image signals is elevated to coincide with the high level reference value of an A/D converter.

However, either of the image reading apparatuses described above requires hardware addition of the peak hold circuit or the automatic gain control circuit, consequently resulting in a cost increase.

SUMMARY OF THE INVENTION

It is, therefore, an object of the present invention is to provide an image reading apparatus which is capable of performing background gray level correction without hardware addition.

Another object of the present invention is to provide an information storing medium which can be advantageously used for such an image reading apparatus.

According to one aspect of the present invention, there is provided an image reading apparatus comprising: reading means for reading images for output of corresponding analog image signals; an A/D converter for converting the analog image signals into multi-bit digital image data; γ-correction means for performing γ-correction of the digital image data; background gray level detection means for detecting a background gray level of the analog image signals on the basis of the digital image data; and coefficient modifying means for modifying a standard set of γ-correction coefficient data into a modified set of γ-correction coefficient data on the basis of the detected background gray level.

With the image reading apparatus described above, the background gray level detection means and the coefficient modifying means can be incorporated in a central processing unit of the image reading apparatus. Thus, the background gray level correction can be realized only by software addition, thereby obviating the need for hardware addition of a peak hold circuit or an automatic gain control circuit for example. Further, since the background gray level correction can be performed together with the γ-correction, the time required for performing the background gray level correction can be minimized.

Preferably, the image reading apparatus may further comprise storing means for storing a standard γ-correction look-up table, so that the coefficient modifying means modifies the standard γ-correction look-up table into a modified γ-correction look-up table on the basis of the detected background gray level for supplying to the γ-correction means. Further, the storing means may also store a coefficient modifying program used for modifying the standard γ-correction look-up table into the modified γ-correction look-up table. The storing means may advantageously comprise a ROM.

Preferably, the image reading apparatus may further comprise a shading compensation circuit between the reading means and the A/D converter for performing shading compensation of the analog image signals. In this case, the background gray level detection means may be in the form of a peak level detection circuit for detecting a peak level of the digital image data which is used for determining the background gray level of the analog image signals. Further, storing means such as a ROM may be provided for storing a peak level detection program.

According to a preferred embodiment, the γ-correction means, the background gray level detection means and the coefficient modifying means are incorporated in a central processing unit of the image reading apparatus.

According to another aspect of the present invention, there is provided an image reading apparatus comprising: reading means for reading images for output of corresponding analog image signals; an A/D converter for converting the analog image signals into multi-bit digital image data; and means for performing γ-correction of the digital image data together with background gray level correction of the digital image data.

Further, the means for performing the γ-correction and the background gray level correction comprises: background gray level detection means for detecting a background gray level of the analog image signals on the basis of the digital image data; coefficient modifying means for modifying a standard γ-correction look-up table into a modified γ-correction look-up table on the basis of the detected background gray level; and γ-correction means for performing γ-correction of the digital image data on the basis of the modified γ-correction look-up table.

According to a further aspect of the present invention, there is provided an information storing medium used for controlling an image reading apparatus which comprises reading means for reading images for output of corresponding analog image signals, an A/D converter for converting the analog image signals into multi-bit digital image data, and γ-correction means for performing γ-correction of the digital image data, the medium storing: a background gray level detection program for detecting a background gray level of the analog image signals on the basis of the digital image data; and a coefficient modifying program for modifying a standard set of γ-correction coefficient data into a modified set of γ-correction coefficient data on the basis of the detected background gray level.

Preferably, the standard set of γ-correction coefficient data may be in the form of a standard γ-correction look-up table. In this case, the coefficient modifying program is used for modifying the standard γ-correction look-up table into a modified γ-correction look-up table as the modified set of γ-correction coefficient data.

Preferably, the background gray level detection program may be in the form of a peak level detection program for detecting a peak level of the digital image data which is used for determining the background gray level of the analog image signals.

Typically, the information storing medium may be in the form of a ROM.

Other objects, features and advantages of the present invention will be apparent from the detailed description of the embodiment given below with reference to the accompanying drawings.

DETAILED DESCRIPTION OF THE PREFERRED EMBODIMENTS

The preferred embodiment of the present invention will be described below with reference to the accompanying drawings.

Figure 1:
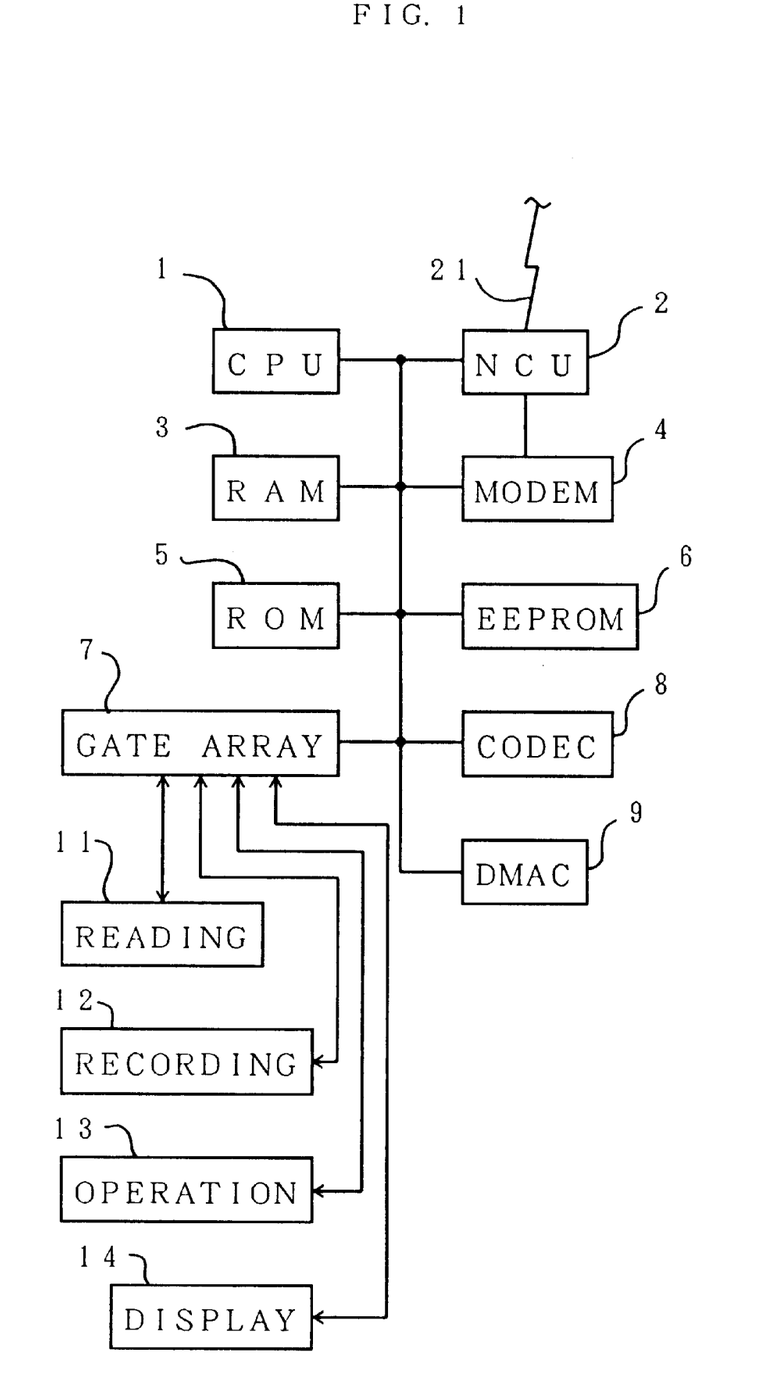
FIG. 1 is a circuit block diagram showing a facsimile machine which incorporates an image reading apparatus embodying the present invention.

Reference is first made to FIG. 1 which is a circuit block diagram showing a facsimile machine embodying the present invention. This facsimile machine comprises a CPU (central processing unit) 1, an NCU (network control unit) 2, a RAM (random access memory) 3, a modem (modulator-demodulator) 4, a ROM (read-only memory) 5, an EEPROM (electrically erasable and programmable ROM) 6, a gate array 7, a codec (coder-decoder) 8, and a DMAC (direct memory access controller) 9. Further, the facsimile machine also comprises a reading unit 11, a recording unit 12, an operation unit 13, and a display unit 14.

The CPU 1, the NCU 2, the RAM 3, the modem 4, the ROM 5, the EEPROM 6, the gate array 7, the codec 8 and the DMAC 9 are connected to each other via bus lines (digital lines) which include data bus lines, address bus lines and control signal bus lines. The gate array 7 is connected to the reading unit 11, the recording unit 12, the operation unit 13 and the display unit 14, respectively.

The CPU 1 provides an overall control of the facsimile machine as a whole.

The NCU 2 is connected to a telephone line 21 for providing network control. The NCU 2 is also connected to the modem 4 through an analog line.

The RAM 3 stores various digital data such as image data. Of course, an additional RAM or RAMs may be provided to increase the capacity of data storage.

The modem 4 modulates the transmitting codes and demodulates the received codes.

The ROM 5 stores various programs or the like as required for controlling the facsimile machine. The ROM 5 also stores a standard set of γ-correction coefficients in the form of a standard look-up table for example. The ROM 5 further stores a coefficient modifying program used for modifying the standard set of γ-correction coefficients (standard look-up table), and a peak level detection program used for background gray level correction, as hereinafter described in detail.

The EEPROM 6 stores registered data (e.g. shortcut dials) and/or flags.

The gate array 7 functions as an I/O interface (input/output interface) for the CPU 1 for data transmission to and/or from the reading unit 11, the recording unit 12, the operation unit 13 and the display unit 14.

The codec 8 performs coding of the transmitting image data and decoding of the received image data.

The DMAC 9 provides memory access control with respect to the RAM 3 for example.

The reading unit 11 reads out the image data from an image carrying paper sheet (not shown) for output through the gate array 7, whereas the recording unit 12 performs printing of images on a recording paper sheet (not shown) on the basis of the image data received through the gate array 7.

The operation unit 13 has key switches to be operated by the user for output of operation signals, whereas the display unit 14 includes an LCD or the like for providing various indications under the control of the CPU 1.

Figure 2:
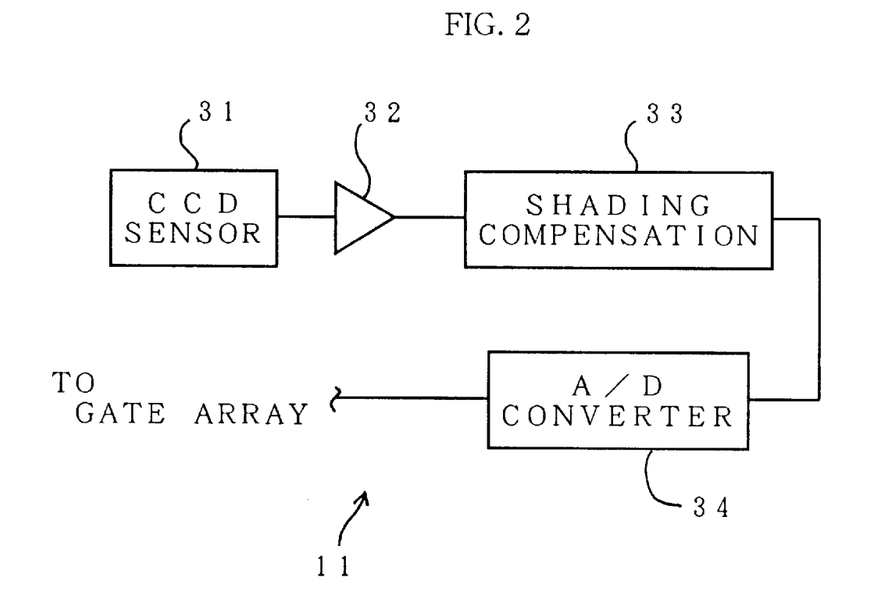
FIG. 2 is a circuit block diagram showing the reading unit of the facsimile machine illustrated in FIG. 1.

FIG. 2 is a schematic block diagram showing the arrangement of the reading unit 11. As shown in this figure, the reading unit 11 includes a CCD (charge coupled device) sensor 31 as an image reading element, an amplifier 32, a shading compensation circuit 33, and an A/D converter (analog to digital converter) 34. The CCD sensor 31 may be replaced by a MOS image sensor or a contact type image sensor, but these examples are not limitative.

Though not illustrated, the reading unit 11 further includes other elements such as a light source for irradiating an image carrying paper and a feed motor for feeding the paper line by line. These other elements are well-known in the art and has nothing to do with the gist of the present invention, consequently requiring no description.

The CCD sensor 31 reads the images of the image carrying paper for output of analog image signals, whereas the amplifier 33 amplifies the analog image signals from the CCD sensor 31. The shading compensation circuit 33 performs shading compensation, in a known manner, with respect to the amplified image signals for correcting errors which are optically caused by positional deviations from the axis of the optical system. The A/D converter 34 converts the compensated analog signals into multi-bit digital image data for output through the gate array 7.

Figure 3:
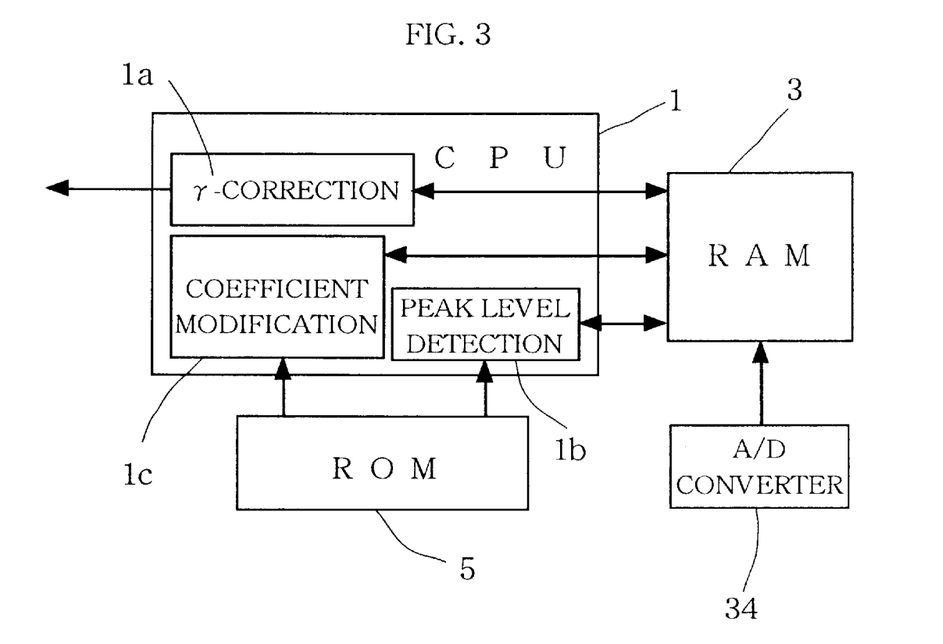
FIG. 3 is a block diagram showing the arrangement of the CPU incorporated in the same facsimile machine.

As shown in FIG. 3, the CPU 1 incorporates a γ-correction circuit 1a, a peak level detection circuit 1b, and a coefficient modifying circuit 1c.

The γ-correction circuit 1a performs γ-correction with respect to the digital image data from the A/D converter 34.

The peak level detection circuit 1b detects the peak level of the digital image data from the A/D converter 34 according to the peak level detection program read out from the ROM 5. The detected peak level represents the background gray level (darkness) of the image carrying paper scanned by the CCD sensor 31 (FIG. 2), and therefore can be used for correcting the background gray level correction.

The coefficient modifying circuit 1c reads out the standard set of γ-correction coefficients and the coefficient modifying program from the ROM 5 for preparing a modified set of γ-correction coefficients (a modified look-up table) according to the peak level detected at the peak level detection circuit 1b. The modified set of γ-correction coefficients thus obtained can be used at the γ-correction circuit 1a for performing γ-correction of the digital image data while also performing background gray level correction.

The facsimile machine thus designed operates in the following manner.

In the transmission mode, the reading unit 11 reads the images of an image carrying paper for output of analog image signals which are processed for shading compensation at the shading compensation circuit 33 and for digitizing at the A/D converter 34. The digital image data thus obtained are then processed at the CPU 1 for γ-correction and background gray level correction. Finally, the digital image data thus corrected are coded at the codec 8 and modulated at the modem 4 for transmission through the NCU 2 and the telephone line 21.

In the copy mode, the reading unit 11 reads the images of an image carrying paper for output of analog image signals which are processed for shading compensation at the shading compensation circuit 33 and for digitizing at the A/D converter 34. The digital image data thus obtained are then processed at the CPU 1 for γ-correction and background gray level correction. Finally, the digital image data thus corrected are transmitted, through the gate array 7, to the recording unit 12 for printing on a recording paper.

In this way, the CPU 1 processes the digital image data for γ-correction and background gray level correction at the same time by preparing a modified set of γ-correction coefficients. Next, reference is made to the flow diagram of FIG. 4 to explain how the CPU 1 performs such image data processing.

Figure 4:
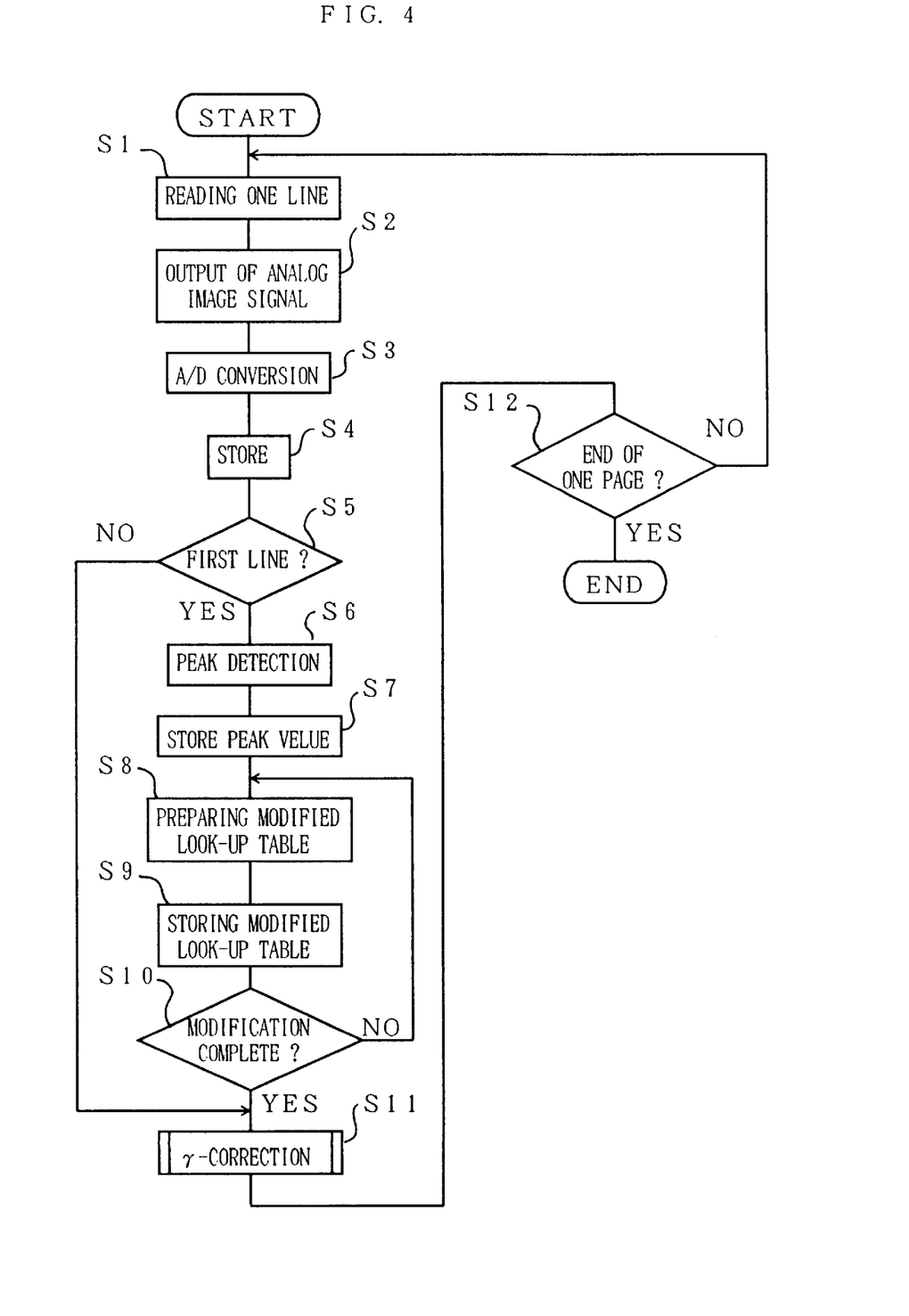
FIG. 4 is a flow diagram showing the successive steps of image processing in the same facsimile machine.

First, the CCD sensor 31 of the reading unit 11 reads one line of the image carrying paper (Step S1) for output of analog image signals (Step S2). As previously described, the resulting analog image signals are amplified at the amplifier 32 and then subjected to shading compensation at the shading compensation circuit 33.

Figure 5:
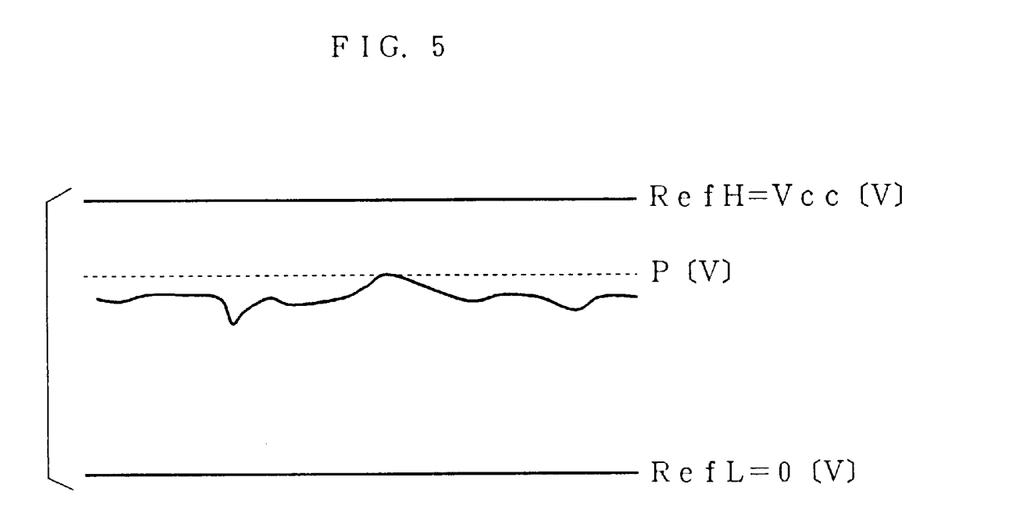
FIG. 5 is a view showing the wave form of analog image signals for input to an A/D converter.
Figure 6:
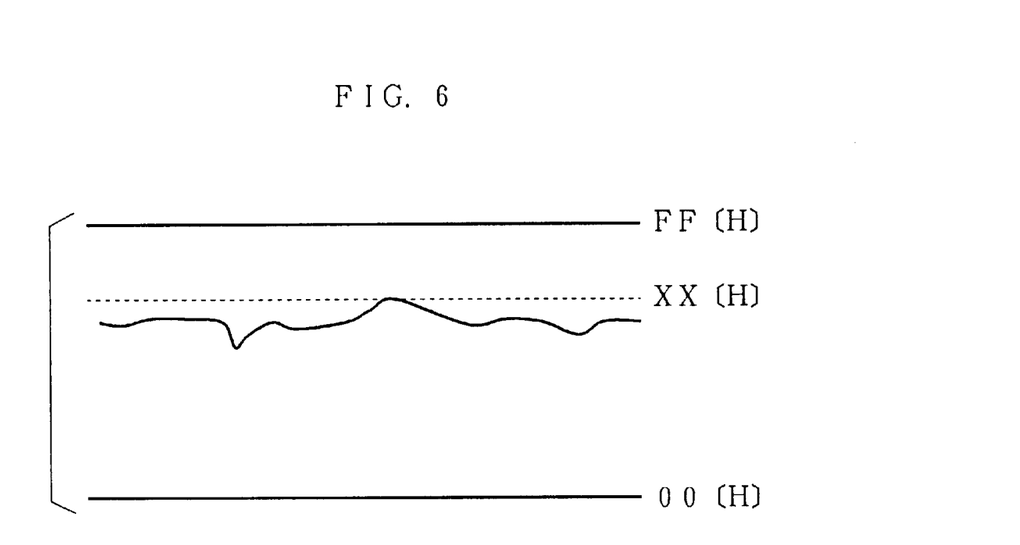
FIG. 6 is a view showing the output digital image signals from the A/D converter.

In Step S3, the compensated analog signals are subjected to analog to digital conversion at the A/D converter 34 to provide multi-bit digital image data. FIG. 5 shows the input analog signals for the A/D converter 34, whereas FIG. 6 shows the output digital image data from the A/D converter 34. As shown in these figures, when the peak voltage P [V] of the analog image signals is lower than the high-level reference voltage RefH for the A/D converter 34, the peak level XX [H] of the output digital image data is also lower than the highest gradation level FF [H] set for the A/D converter 34. Thus, at this stage, background gray level correction is not performed for adjusting the peak voltage P [V] of the analog image signals to coincide with the highest gradation level FF [H].

According to the illustrated embodiment, the A/D converter 34 is designed to convert each of the analog image signals (corresponding to each of the picture elements) into a 8-bit digital image signal. Further, the high-level reference voltage RefH is the power source voltage Vcc [V], whereas the low-level reference voltage RefL is the ground level (namely, 0 [V]). Further, the notation "[H]" represents a hexadecimal number.

The output digital image data from the A/D converter 34 supplied through the gate array 7 for storing in the RAM 3 (Step S4).

Then, the CPU 1 determines whether or not the digital image data stored in the RAM 3 are those for the first line (Step S5). Such a determination step is performed because the background gray level of each page (image carrying paper) as a whole can be determined by checking the peak level of the digital image data for the first line. For this purpose, a flag "1" may be set at the time of starting the processing of the image signals for each page, and the flag is reset to "0" when the signal processing for the first line finishes.

If the digital image data stored in the RAM 3 are those for the first line of the page ("Yes" in Step S5), the peak level detection circuit 1b of the CPU 1 detects the peak value of the first line image data (Step S6). The detected peak value may be XX [H] in FIG. 6 for example. Such detection may be readily carried out by successively comparing the digital image data for the respective picture elements.

Then, the CPU 1 causes the detected peak value XX [H] to be stored in the RAM 3 (Step S7).

Then, the coefficient modifying circuit 1c of the CPU 1 prepares a modified γ-correction look-up table by calculation. For this purpose, the coefficient modifying circuit 1c reads out the standard γ-correction look-up table from the ROM 5 as well as the background gray level (the detected peak value XX [H]) from the RAM 3, and calculates the products of the input values of the standard γ-correction look-up table and XX[H]/FF[H]. Such calculation can be easily performed since FF [H] (namely, the resolution of the A/D converter 34) is stored in the ROM 5 in advance.

More specifically, a γ-correction look-up table is a table which provides relationship between the input values (namely, the pre-γ-corrected image data) and the output values (namely, the post-γ-corrected image data), and the ratio between each input value and a corresponding output value is represented by a respective γ-correction coefficient. Thus, replacing the input values of the standard γ-correction look-up table with the products of the input values of the standard γ-correction look-up table and XX[H]/FF[H] is equivalent to replacing standard γ-correction coefficients with the products of the standard γ-correction coefficients and XX[H]/FF[H].

Figure 7:
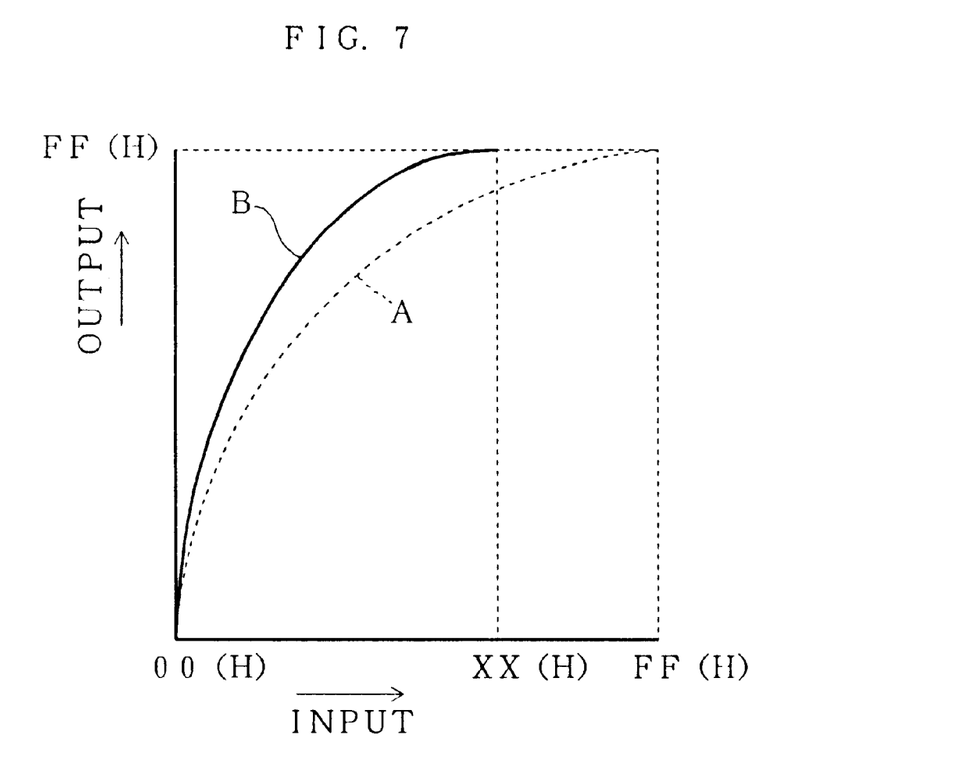
FIG. 7 is a graph showing the relationship between the input image data and the output image data for γ-correction.
Figure 8:
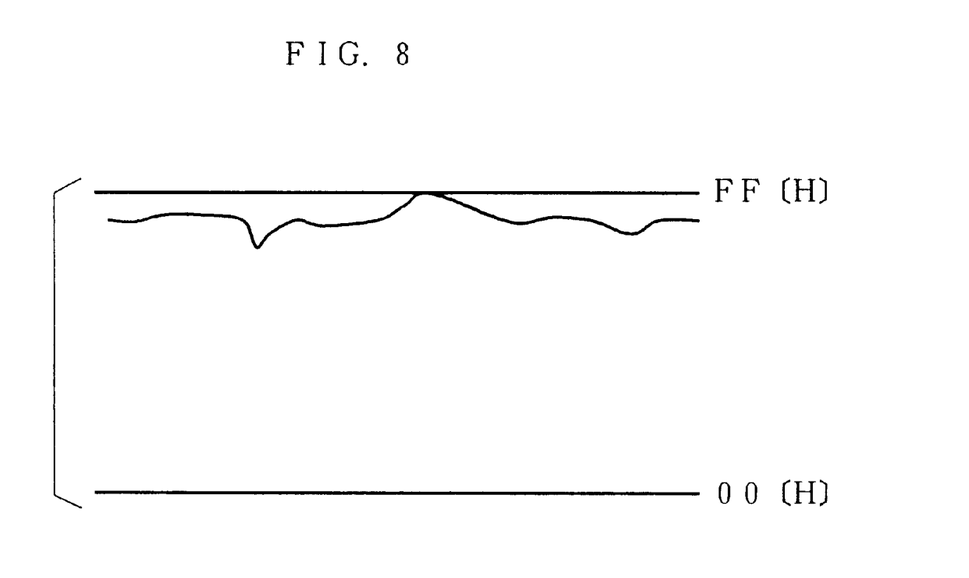
FIG. 8 is a view showing the wave form of the output image signals after γ-correction.

In FIG. 7, a broken line curve A corresponds to the standard γ-correction look-up table stored in the ROM 5, whereas a solid line curve B corresponds to the modified γ-correction look-up table prepared by multiplying the input values of the standard γ-correction look-up table with XX[H]/FF[H]. Further, as a result of such multiplication, the peak value XX [H] of the digital image data before modification is raised to FF [H] after modification, as shown in FIG. 8. Thus, by using the modified γ-correction look-up table, the digital image data can be processed not only for γ-correction but also for background gray level correction.

The modified γ-correction look-up table thus obtained is stored in the RAM 3 (Step S9).

Then, the CPU 1 determines whether the modification of the standard γ-correction look-up table is complete (Step S10).

If "Yes" in Step S10, the γ-correction circuit la of the CPU 1 performs γ-correction by referring the modified γ-correction look-up table (Step S11). Specifically, the γ-correction circuit la successively reads out the digital image data for each line of the page and compares them to the input values of the modified γ-correction look-up table for storing the corresponding output values of the modified γ-correction look-up table in the RAM 3.

Then, the CPU 1 determines whether the image processing of one whole page is complete (Step S12).

If "Yes" in Step S12, the above-described routine finishes. However, if there is any further page to be read, the same routine is simply repeated.

If "No" in Step S12, the image data for the next line are processed by returning to Step S1.

If the modification of the standard γ-correction look-up table is still complete ("No" in Step S10), the table modification continues (return to Step S8).

On the other hand, if the digital image data read out from the RAM 3 are not those for the first line of the page ("No" in Step S5), the image processing proceeds to Step S11 for performing γ-correction (accompanied by background gray level correction). Such skipping is acceptable because the background gray level of each page can be determined solely on the basis of the image data for the first line, so that the table modification is unnecessary for the second or any subsequent line.

According to the embodiment described above, background gray level correction is performed simultaneously with γ-correction. Thus, it is possible to create a clear-cut image or images even if the background of the image carrying paper is relatively dark.

In the above-described embodiment, modification of the standard γ-correction look-up table is performed for every page. However, in case where a series of pages is successively read, it is likely that all pages are identical or similar in background gray level. Therefore, in such a case, modification of the standard γ-correction look-up table may be performed only for the first page, and the same modified table may be utilized for any subsequent page of the same series.

Further, instead of storing the standard γ-correction look-up table, the ROM 5 may store a set of arithmetic formulas for calculating a standard set of γ-correction coefficients, and the coefficient modifying circuit 1c may be designed to modify the set of arithmetic formulas for calculating a modified set of γ-correction coefficients.

According to the illustrated embodiment, the A/D converter 33 converts the analog image data into the digital image data after the shading compensation circuit 33 performs shading compensation for the analog image data, so that the peak level of the converted digital data is regarded to represent the background gray level. However, the shading compensation may be performed after the A/D conversion, and the background gray level may be determined after the A/D conversion but before the shading compensation. In the latter case, the peak level of the converted digital image data before shading compensation does not necessarily coincide with the peak level of the image data after shading compensation, so that the degree of shading compensation need be stored in advance as digital data for use to determine the background gray level on the basis of the digital image data which are not processed for shading compensation.

In the illustrated embodiment, the standard γ-correction look-up table is stored in the ROM 5. However, the standard γ-correction table may be alternatively stored in the EEPROM 6.

Moreover, while the illustrated embodiment is applied to the facsimile machine, the present invention may also be applied to any other apparatus such as an image scanner or a digital photocopying machine which requires processing of images read from an image carrying paper or medium.

The present invention being thus described, it is obvious that the same may be varied in many ways. Such variations should not be regarded as a departure from the spirit and scope of the present invention, and all such modifications as would be obvious to those skilled in the art are intended to be included within the scope of the following claims.

What is claimed is:

1. An image reading apparatus comprising:

reading means for reading images of an image carrying paper for output of corresponding analog image signals;

an A/D converter for converting the analog image signals into multi-bit digital image data;

γ-correction means for performing γ-correction of the digital image data;

background gray level detection means for detecting a background gray level on the basis of the digital image data, the detected background gray level corresponding to a gray level of the image carrying paper; and coefficient modifying means for modifying a standard set of γ-correction coefficient data into a modified set of γ-correction coefficient data on the basis of the detected background gray level; and storing means for storing a standard γ-correction look-up table, the coefficient modifying means modifying the standard γ-correction look-up table into a modified γ-correction look-up table on the basis of a ratio between the detected background gray level and a digital reference signal for supplying to the γ-correction means;

wherein the storing means also stores a coefficient modifying program used for modifying the standard γ-correction look-up table into the modified γ-correction look-up table.

2. The image reading apparatus according to claim 1, wherein the storing means comprises a ROM.

3. The image reading apparatus according to claim 1, further comprising a shading compensation circuit for performing shading compensation of the analog image signals before performing the γ-correction.

4. The image reading apparatus according to claim 3, wherein the background gray level detection means comprises a peak level detection circuit for detecting a peak level of the digital image data which is used for determining the background gray level of the analog image signals.

5. The image reading apparatus according to claim 4, further comprising storing means for storing a peak level detection program.

6. The image reading apparatus according to claim 5, wherein the storing means comprises a ROM.

7. The image reading apparatus according to claim 1, wherein the γ-correction means, the background gray level detection means and the coefficient modifying means are incorporated in a central processing unit of the image reading apparatus.

8. An information storing medium used for controlling an image reading apparatus which comprises reading means for reading images of an image carrying paper for output of corresponding analog image signals, an A/D converter for converting the analog image signals into multi-bit digital image data, and γ-correction means for performing γ-correction of the digital image data, the medium storing:

a background gray level detection program for detecting a background gray level on the basis of the digital image data, the detected background gray level corresponding to a gray level of the image carrying paper; and a coefficient modifying program for modifying a standard γ-correction look-up table into a modified γ-correction look-up table on the basis of a ratio between the detected background gray level and a digital reference signal.

9. The information storing medium according to claim 8, wherein the background gray level detection program is in the form of a peak level detection program for detecting a peak level of the digital image data which is used for determining the background gray level of the analog image signals.

10. The information storing medium according to claim 8, wherein the medium comprises a ROM.

11. The image apparatus according to claim 1, wherein the detected background gray level corresponds to a peak level of the digital image data.

12. The image reading apparatus according to claim 1, wherein the digital reference signal is a maximum digital output.

13. The image reading apparatus according to claim 8, wherein the detected background gray level corresponds to a peak level of the digital image data.

14. The image reading apparatus according to claim 8, wherein the digital reference signal is a maximum digital output.

15. An image reading apparatus comprising:

reading means for reading images of an image carrying paper for output of corresponding analog image signals;

an A/D converter for converting the analog image signals into multi-bit digital image data;

γ-correction means for performing γ-correction of the digital image data;

background gray level detecting means for detecting a background gray level on the basis of the digital image data, the detected background gray level corresponding to a gray level of the image carrying paper;

first storing means for storing a standard γ-correction look-up table;

coefficient modifying means for modifying the standard γ-correction look-up table into a modified γ-correction look-up table on the basis of the detected background gray level; and second storing means for storing the modified γ-correction look-up table;

wherein the γ-correction means performs the γ-correction of the digital image data based on the modified γ-correction look-up table stored in the second storing means.

16. The image reading apparatus according to claim 15, wherein the standard γ-correction look-up table is modified into the modified γ-correction look-up table on the basis of a ratio between the detected background gray level and a digital reference signal.

17. The image reading apparatus according to claim 16, wherein the detected background gray level corresponds to a peak level of the digital image data.

18. The image reading apparatus according to claim 16, wherein the digital reference signal is a maximum digital output.

* * * * *